(12) United States Patent
Al-Taq et al.

(10) Patent No.: US 8,496,061 B2
(45) Date of Patent: Jul. 30, 2013

(54) VDA/ACID SYSTEM FOR MATRIX ACID STIMULATION

(75) Inventors: Ali A. Al-Taq, Qatif (SA); Ayman R. Nakhli, Dammam (SA); Habeeb H. Haji, Qatif (SA); Jaffar A. Saleem, Saihat (SA)

(73) Assignee: Saudi Arabian Oil Company, Dhahran (SA)

( * ) Notice: Subject to any disclaimer, the term of this patent is extended or adjusted under 35 U.S.C. 154(b) by 276 days.

(21) Appl. No.: 13/009,055

(22) Filed: Jan. 19, 2011

(65) Prior Publication Data

US 2012/0181022 A1    Jul. 19, 2012

(51) Int. Cl.
  *E21B 43/27*    (2006.01)
(52) U.S. Cl.
  USPC .......................................... 166/307; 166/271
(58) Field of Classification Search
  None
  See application file for complete search history.

(56) References Cited

U.S. PATENT DOCUMENTS

| | | |
|---|---|---|
| 6,399,547 B1 * | 6/2002 | Frenier et al. ................. 507/268 |
| 7,148,184 B2 | 12/2006 | Francini et al. |
| 7,299,870 B2 | 11/2007 | Garcia-Lopez De Victoria et al. |
| 7,320,952 B2 | 1/2008 | Chen et al. |
| 7,387,987 B2 | 6/2008 | Chen et al. |
| 7,402,549 B2 | 7/2008 | Chen et al. |
| 7,666,821 B2 | 2/2010 | Fu |
| 7,741,252 B2 | 6/2010 | Chen et al. |
| 2008/0167205 A1 | 7/2008 | Chen et al. |
| 2009/0149352 A1 | 6/2009 | Chen et al. |

FOREIGN PATENT DOCUMENTS

CA    2354789    2/2002

OTHER PUBLICATIONS

Ayman R. Al-Nakhli et al.; "Interactions of Iron and Viscoelastic Surfactants During Well Stimulation: A New Formation Damage Mechanism"; Society of Petroleum Engineers; 2008; Abstract.

* cited by examiner

*Primary Examiner* — Zakiya W Bates
(74) *Attorney, Agent, or Firm* — Abelman, Frayne & Schwab

(57) ABSTRACT

A method of preventing phase separation of a viscoelastic surfactant fluid or diverting agent due to ferric ions during matrix acidizing of an oil well which involves the injection of both citric acid and acetic acid which prevents the separation of the viscoelastic diverting agent/acid with ferric ions which avoids damage to well productivity and/or injectivity.

3 Claims, No Drawings

VDA/ACID SYSTEM FOR MATRIX ACID STIMULATION

BACKGROUND OF THE INVENTION

1. Field of the Invention

This invention relates to the stimulation of oil wells in subterranean formation by matrix acid stimulation or fracturing. More particularly, it relates to a method of employing a new viscoelastic surfactant acid composition to tolerate high iron ions.

2. Description of Related Art

Acidizing is a method in which an acidic fluid comes in contact with a subterranean formation, known as the matrix, which is penetrated by a wellbore. The acidizing fluid contacts and dissolves wellbore damage and/or part of the matrix.

The typical matrix acid stimulation is a multistage process which includes alternating stages. Initially, an emulsified acid (20 wt % HCl) is injected, which is followed by injecting a spacer (non-emulsified 20 wt % HCl) which typically includes certain additives, such as a corrosion inhibitor, an iron control agent, a water wetting surfactant and an $H_2S$ scavenger, as needed. Thereafter, a viscoelastic diverting agent (VDA)/agent is injected.

It is important that the injected acid reach the entire target zone to achieve maximum benefit. This is often difficult to achieve because of a natural tendency of the acid to react with the first reactive formation rock with it contacts, whether it is closest to the wellbore, or at its most porous portion, in matrix acidizing. Attempts to achieve complete contact of acid with an entire rock formation zone, which is referred to as zonal coverage, involves diversion of the acid flow from the region first contacted (high permeability) to new less permeable regions (more damaged) regions by injection of the above-referenced VDA.

One method of achieving zonal coverage which has met with a good deal of success in the last number of years is by placement of a gel or a foam, after treatment of a zone, which impedes fluid flow into the treated zone and diverts the acid into a new, still untreated, zone. Such viscoelastic surfactant-based acids are usually either amphoteric or cationic. Once the acid reacts with the carbonate formation and the pH increases above 2, and the concentrations of calcium and magnesium ions increases, these surfactants form long rod-shaped micelles. As a result, the viscosity of the solution increases significantly. This results in better acid diversion in matrix acid stimulation treatments.

Acid diversion is considered an imperative issue which contributes to the success of any acid stimulation treatment. A good diversion system results in improved zonal coverage resulting in increased hydrocarbon output from the stimulation treatment.

A problem that has been encountered when employing a viscoelastic diverting agent (VDA), such as a viscoelastic surfactant (VES), is its interaction with iron. (Paper SPE 117060, Nakhli et al. 2008). Interaction of iron ions arises from corrosion or formation water which tends to change the properties of the VDA, which renders it unsuitable for acid diversion.

During a matrix acidizing treatment, the acid can be contaminated with iron compounds at all stages. Rust present in storage tanks and mixing tanks can be dissolved by acid and produce a mixture of iron (II) and iron (III). Large quantities of iron ions in live acids can result when acid dissolves mill scale in new tubing or corrosion products. According to the literature, the content of iron at the wellhead can vary from 200 to 3500 mg/L and the returning acid iron concentration can vary from 9,000 to 100,000 mg/L. Also, formation brine may contain iron.

The interaction of iron with VDA/acid system will adversely affect the performance of VDA. The following adverse effects can be expected:
phase separation which will result in malfunction of the VDA which results in no diversion taking place, and
precipitation which will result in damaging well productivity or injectivity.

In matrix acidizing treatments where a viscoelastic surfactant is not employed, very small quantities of chelating agents are added to prevent iron precipitation. In those instances in the prior art where a viscoelastic diverting agent, e.g. a surfactant, is employed in conjunction with acidizing, the chelating agents that are added are at a very low concentration. For example, Chen et al U.S. Pat. No. 7,320,952 discloses the addition of just 0.05%, by weight, of a chelating agent, based on actives, which is done solely to prevent iron precipitation. There is no disclosure of preventing interaction with the viscoelastic surfactant which is present. Chen et al. teaches the addition of iron chelating or sequestering agents to prevent iron precipitation once the acid is spent due to its reaction with formation rock or acid reactive minerals.

SUMMARY OF THE INVENTION

It has now been found that when a viscoelastic diverting agent, such as a viscoelastic surfactant, is used during matrix acidizing, the addition of both citric acid and acetic acid prevents VDA/acid separation and precipitation upon interaction of VDA/acid with iron ions. The citric acid functions as an iron chelating agent, while the acetic acid acts as a buffer solution that enhances the performance of the citric acid.

In one aspect of the invention, the presence of chelating agents in the VDA/acid system has a substantial effect in limiting or eliminating corrosion due to the acid/iron-containing surfaces reaction.

In another aspect of the invention, the presence of significant quantities of chelating agents maintains the integrity of the VDA, thus providing an efficient acid treatment.

In another aspect of the invention, the risk of damaging well productivity and/or injectivity by preventing/minimizing the presence of damaging materials in the near wellbore area due to interaction of VDA with iron ions is materially increased.

In still another aspect of the invention, the corrosion rate is reduced significantly.

DETAILED DESCRIPTION OF THE INVENTION

Surfactants and fluids according to the present invention may be characterized as viscoelastic in that they exhibit recoil and the physical property of reversible shear thinning. The viscoelastic surfactants and fluids according to the invention have a reduced fluid viscosity when shear is applied, and that viscosity is at least partially recovered after the applied stress is removed. These properties of the surfactants contribute to ease of handling since the fluids may be readily pumped without the loss of viscosity which is required for its use according to the present invention.

In the method of the present invention, while the preferred concentration of the HCl is about 7 wt %, concentrations of from about 3 wt % to about 10 wt % may be employed to advantage.

In one aspect of the present invention, the VES is mixed with the acid prior to injection of the acid in the formation. In another aspect, the VES is added after the acid injection.

While the addition of from about 3 wt % to about 10 wt % citric acid and from about 3 wt % to about 10 wt % of acetic acid serves to avoid phase separation and precipitation of $Fe^{3+}$ ions, it has been found that the addition of about 5 (wt %)

citric acid and about 7 (wt %) of acetic acid provides the optimum benefit while minimizing costs.

In the practice of the method of the present invention, various types of viscoelastic diverting surfactants may be employed to advantage as the diverting agent, exemplary of which are cationic, zwitterionic, anionic and nonionic surfactants. It is preferred to employ a cationic viscoelastic surfactant wherein its concentration in the VDA/Acid system according to the present invention is from about 1 vol. % to about 12 vol. %, with a concentration of 6 vol. % being especially preferred.

The cationic viscoelastic surfactant of the present invention can be a branched chain or straight chain, aromatic, saturated, or unsaturated. It may include a carbonyl, an amide, an imide, a urea or an amine. It is preferred to employ a cationic surfactant which consists of propylene glycol and a quaternary amine. A particularly preferred commercially available cationic surfactant is SGA-7 made by Halliburton Energy Services. SGA-7 is a surfactant gelling agent for acidizing applications using HCl. While little viscosity is imparted to the live acid by SGA-7, once the acid is spent its viscosity climbs rapidly. As such HCl gelled with SGA-7 forms a very effective self-diverting acid system.

The benefits to be realized by the process of the present invention are best illustrated by the following examples.

EXAMPLE 1

VES Without Chelating Agent

To a formulation consisting of hydrochloric acid having a concentration of 28 wt % and SGA-7 (Halliburton) cationic surfactant having a concentration of 6 vol. % in a series of eight (8) stoppered bottles, there was added different quantities of iron ($Fe^{3+}$) as set forth in Table 1 below.

Immediately upon mixing the contents in each of the bottles, suspended materials or a precipitate appeared. Upon standing for about one (1) minute (see Table 1), phase separation occurred in bottles 4,5 and 6, while suspended material remained in bottle 7 and a precipitate formed in bottle 8.

TABLE 1

| Bottle No. | Quantity of $Fe^{3+}$ (ppm) | Appearance |
|---|---|---|
| 1 | 1000 | No phase separation but significant increase in VDA/acid solution viscosity |
| 2 | 1100 | No phase separation but significant increase in VDA/acid solution viscosity |
| 3 | 1200 | No phase separation but significant increase in VDA/acid solution viscosity |
| 4 | 1300 | Phase separation |
| 5 | 1400 | Phase separation |
| 6 | 2000 | Phase separation |
| 7 | 5000 | Formation of suspended material |
| 8 | 10,000 | Precipitate |

EXAMPLE 2

(VES with 0.05 and 0.5 wt % Citric Acid Chelating Agent)

To a series of four (4) test tubes each containing 20 wt % HCl and 6 vol. % of SGA-7 cationic surfactant there were added $Fe^{3+}$ ions and citric acid in the quantities indicated in Table 2.

The contents of the test tubes were mixed at 25° C. (ambient temperature).

The formation of suspended material occurred in all test tubes almost immediately upon commencing mixing. Phase separation in test tubes 1 and 2 began after about one (1) minute. (See Table 2.)

TABLE 2

| Test Tube | Quantity of $Fe^{3+}$ (ppm) | Citric Acid (wt %) | Appearance |
|---|---|---|---|
| 1 | 2000 | 0.05 | Phase separation |
| 2 | 2000 | 0.50 | Phase separation |
| 3 | 5000 | 0.05 | Formation of suspended material |
| 4 | 5000 | 0.50 | Formation of suspended material |

The use of 0.05 wt % or 0.50% of citric acid with either 2000 or 5000 ppm of $Fe^{3+}$ ions resulted in either phase separation or the formation of suspended material.

EXAMPLE 3

To a series of three (3) test tubes each containing 20 wt % HCl and 6 vol. % SGA™-7 cationic surfactant, there were added $Fe^{3+}$ ions, citric acid and acetic acid in the quantities indicated in Table 3.

TABLE 3

| 20 wt % HCal + 6 vol % VES + iron ion + acetic acid + citric acid | | | | |
|---|---|---|---|---|
| Test Tube No. | Quantity of Fe3+ (ppm) | Citric Acid (wt %) | Acetic Acid (vol %) | Appearance |
| 1 | 2,000 | 0.05 | 1 | Phase separation |
| 2 | 2,000 | 0.5 | 2 | Phase separation |
| 3 | 5,000 | 0.5 | 2 | Formation of suspended material |

The formation of suspended material occurred immediately upon commencing the mixing of the contents in test tube 3 and remained suspended upon standing. In test tubes 1 and 2 phase separation of the suspended material occurred after standing for about three (3) minutes. The use of 0.05 wt % or 0.5 wt % citric acid with either 1 or 2% acetic acid resulted in phase separation or suspended material.

EXAMPLE 4

VES with Chelating Agent in Accordance with the Present Invention

In this example, a formulation or fluid system was prepared which included hydrochloric acid, a cationic viscoelastic surfactant, citric acid and acetic acid, as set forth below.

Formulation of the New VDA/Acid System

| Additive | Concentration |
|---|---|
| Hydrochloric Acid (HCl) | 7 (wt %) |
| Acetic Acid | 7 (wt %) |
| Citric Acid | 5 (wt %) |
| SGA-7 (cationic surfactant) | 6 (vol %) |

The formulation was added to a series of six (6) stoppered bottles containing varying amounts of $Fe^{+3}$ ion. As can be seen by reference to Table 4, the amount of $Fe^{+3}$ was 1,000 ppm in the 1$^{st}$ bottle with the quantities increasing in each succeeding bottle until there were 11,000 ppm of $Fe^{+3}$ in the 6$^{th}$ bottle. The contents of bottles were mixed for about (1) minute and allowed to stand for about 5 minutes at ambient temperature) (25° and were then examined.

TABLE 4

| Bottle No. | Quantity of $Fe^{3+}$ (ppm) | Appearance |
| --- | --- | --- |
| 1 | 1000 | No phase separation or precipitation |
| 2 | 2000 | No phase separation or precipitation |
| 3 | 5000 | No phase separation or precipitation |
| 4 | 8000 | No phase separation or precipitation |
| 5 | 10,000 | No phase separation or precipitation |
| 6 | 11,000 | No phase separation or precipitation |

As can be appreciated from Table 4, the VES/acid formulation of the present invention in the presence of 5 wt % citric acid and 7 wt % acetic acid was able to maintain up to 11,000 ppm of $Fe^{3+}$ in solution without the occurrence of any phase separation or precipitation.

Various modifications of the disclosed embodiment as well as alternative embodiments of the invention will become apparent to persons skilled in the art upon reference to the description of the invention. It is therefore contemplated that the appended claims will cover any such modifications or embodiments that fall within the scope of the invention.

What is claimed is:

1. A method of preventing phase separation of a viscoelastic surfactant/acid composition during matrix acidizing of a subterranean formation caused by iron precipitation, which comprises:
   a. providing a viscoelastic surfactant fluid system comprising a cationic surfactant having a concentration of 1 to about 12 vol. %, hydrochloric acid having a concentration of about 20 wt %, citric acid having a concentration of about 3 to about 10 wt %, and acetic acid having a concentration of about 3 to about 10 wt %; and,
   b. injecting the viscoelastic fluid system in the subterranean formation whereby at least 11,000 ppm of $Fe^{3+}$ are maintained in solution without phase separation or precipition.

2. The method of claim 1, wherein the concentration of citric acid is about 5 wt % and the concentration of acetic acid is about 7 wt %.

3. The method of claim 1, wherein the concentration of the cationic surfactant is about 6 vol %.

* * * * *